(12) United States Patent
Henneberger

(10) Patent No.: US 8,764,305 B2
(45) Date of Patent: Jul. 1, 2014

(54) WHEEL BEARING UNIT

(75) Inventor: Wolfram Henneberger, Memmelsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/812,615

(22) PCT Filed: May 23, 2011

(86) PCT No.: PCT/EP2011/058339
§ 371 (c)(1),
(2), (4) Date: Jan. 28, 2013

(87) PCT Pub. No.: WO2012/019799
PCT Pub. Date: Feb. 16, 2012

(65) Prior Publication Data
US 2013/0129271 A1    May 23, 2013

(30) Foreign Application Priority Data
Aug. 9, 2010 (DE) .......................... 10 2010 033 823

(51) Int. Cl.
*F16C 19/54* (2006.01)

(52) U.S. Cl.
USPC .......................................... 384/551; 384/589

(58) Field of Classification Search
USPC ......... 384/551, 559, 561, 564, 569, 571, 584, 384/589, 501, 504, 505
See application file for complete search history.

(56) References Cited

U.S. PATENT DOCUMENTS

| | | | |
|---|---|---|---|
| 3,977,741 A | 8/1976 | Lundberg | |
| 4,061,377 A | 12/1977 | Nordstrom | |
| 4,692,040 A * | 9/1987 | Ebaugh et al. | 384/484 |
| 5,492,419 A | 2/1996 | Miller et al. | |
| 5,651,617 A | 7/1997 | Danielsson | |
| 5,667,313 A * | 9/1997 | Kapaan et al. | 384/544 |
| 6,033,120 A * | 3/2000 | Obara | 384/504 |
| 7,121,728 B2 * | 10/2006 | Pete et al. | 384/477 |
| 8,186,884 B2 | 5/2012 | Henneberger | |
| 2003/0094849 A1 * | 5/2003 | Joki et al. | 301/105.1 |
| 2009/0175570 A1 | 7/2009 | Schaefer et al. | |

FOREIGN PATENT DOCUMENTS

| | | |
|---|---|---|
| DE | 24 30 609 | 1/1975 |
| DE | 26 30 379 | 2/1977 |
| DE | EP 0 126 607 | 11/1984 |
| DE | 195 26 167 | 1/1996 |
| DE | 694 09 511 | 11/1998 |
| DE | 198 58 973 | 2/2000 |
| DE | 199 61 712 | 7/2001 |
| DE | 10 2004 018 901 | 7/2005 |
| DE | 10 2006 017 162 | 10/2007 |
| DE | 10 2006 026 433 | 12/2007 |

* cited by examiner

*Primary Examiner* — Thomas R Hannon
(74) *Attorney, Agent, or Firm* — Davidson, Davidson & Kappel, LLC

(57) ABSTRACT

A wheel bearing unit having two mirror-symmetrically arranged tapered roller bearings (02), each having one inner ring (04) and one outer ring (03). The tapered roller bearings are connected via the inner rings. The wheel bearing unit includes an inner intermediate ring (08) and an outer intermediate ring (07), each of which are arranged in the axial direction between the inner rings or between the outer rings of the tapered roller bearing. The wheel bearing unit is connected via a latching connection (16, 17) between the inner rings and the inner intermediate ring.

9 Claims, 2 Drawing Sheets

WHEEL BEARING UNIT

The invention relates to a wheel bearing unit, in particular for utility vehicles, having two tapered roller bearings which are arranged in a mirror-inverted manner.

BACKGROUND

Wheel bearings and wheel hubs are known to be highly loaded components for wheel suspensions on the chassis of a motor vehicle, which must withstand an extremely wide variety of loads in particular in utility motor vehicles. A long service-life and maintenance-free use of the wheel bearings and wheel hubs are decisive competitive advantages of such utility vehicles. In spite of the very long service-life and freedom from maintenance, a repair of defective bearings is often necessary and more cost-effective than a new replacement. To this end, wheel bearing units are offered as replacement parts in the aftermarket sector.

In wheel bearing units for utility motor vehicles, so-called insert tapered roller bearing units are primarily used.

A so-called insert bearing is also known from DE 10 2006 017 162 A1. The insert wheel bearing unit described in this instance is a replaceable unit which can be assembled without specific technical knowledge and without special tools using simple auxiliary tools available in repair workshops, without any special requirement in terms of cleanliness during assembly. The bearing unit comprises two tapered roller bearings, each having an outer ring and an inner ring, between which a row of tapered rollers is arranged in each case. The tapered roller bearings are arranged in a mirror-inverted manner with respect to each other in the wheel hub and fixed using a securing ring. During assembly, the individual wheel bearings are axially pressed into the wheel hub, a projection in the wheel hub acting as a stop in each case. Owing to axial insertion of a securing ring into corresponding grooves of the inner rings, the inner rings are connected to each other and the bearing is fixed.

A connection ring for holding together inner raceway portions of adjacent bearings is known from DE 694 09 511 T2. The connection ring has a high level of strength and enables simple assembly of two bearings, for example, to form a wheel bearing. The connection ring is produced from a resilient material and has two opposing rows of outwardly protruding resilient tongues, which rows extend at the periphery. Owing to the resilient tongues, the connection ring can be readily inserted into the inner raceway of a bearing. When the connection ring is in its end position, the tongues spring outwards in order to lock the ring at the location thereof. The inner raceway of the second bearing can then be pressed onto the exposed half of the connection ring until it is locked by the tongue of the second peripheral row. The outer rings are each introduced into the wheel hub from different sides as far as a stop. The inner rings of the bearings strike each other with the end faces thereof, that is to say, the inner rings must be produced with a larger width than the outer rings. This means a great material use of expensive roller bearing steel.

There is known from DE 10 2004 018 901 B3 a roller bearing subassembly which can be mounted on a frustoconical hub. The roller bearing subassembly comprises an outer ring which is constructed in one piece and an inner ring which is constructed in at least two pieces. The roller members are tapered rollers. At the location at which the two inner rings are in mutual abutment in accordance with provisions, both inner rings are constructed so as to be able to engage one in the other in an axial direction. To this end, each of the inner rings is provided in an end region towards the said side with an annular groove which is constructed in an axial direction as an undercut so as to co-operate with an annular region located upstream of the groove in the direction towards the said end. The mutually facing covering faces of the annular regions are provided with a thread. The inner rings can thereby be screwed securely one inside the other during first assembly. In the assembled state, the threads are released from each other. The connection is releasable and can be loaded in an axial direction. The total width of the inner and outer rings must correspond to the total width of the bearing unit.

DE 198 58 973 C1 describes a multi-row roller bearing having at least two separate inner and/or outer rings. The two axially adjacent inner or outer rings are connected to each other in the region of the common assembly joint by means of a connection element. In an axial cylindrical portion of the separation joint, there is provided a recess in which a wire-like connection element is inserted.

From DE 10 2006 026 443 A1, there is known a roller bearing having two inner rings and a sealing arrangement for sealing the separation joint between the inner rings.

From DE 199 61 712 B4 there is known a multi-row roller bearing having at least two separate inner and/or outer rings which are directly connected to each other. The inner rings each have an axially extended region having a recess, the outer contour of one inner ring engaging in the recess of the other inner ring. This bearing has a single non-divided outer ring. This also involves high material costs for the expensive roller bearing steel.

The known insert bearing units, depending on the total width of the bearing unit, have long and consequently expensive inner rings. The bearing units having a single-piece outer ring are expensive to produce with a high use of roller bearing material.

SUMMARY OF THE INVENTION

It is an object of the present invention is to provide a wheel bearing unit which can be produced in a cost-effective manner, which is simple to assemble and which ensures a very long service-life.

The present invention provides a wheel bearing unit comprising two tapered roller bearings which are arranged in a minor-inverted manner with respect to each other and which each have an inner ring and an outer ring. Tapered rollers acting as roller members are preferably guided in a cage between the inner ring and the outer ring.

According to the invention, the wheel bearing unit further comprises an inner and an outer intermediate ring which are arranged in an axial direction between the inner rings or between the outer rings of the tapered roller bearings, respectively.

A connection of the two generally single-width tapered roller bearings to form a wheel bearing unit is carried out by means of the inner intermediate ring which acts as a spacer and a connection means. The connection is preferably carried out by means of a catch connection between the intermediate ring and the two inner rings with completely preassembled individual tapered roller bearings.

The advantages of the invention are in particular that a cost-effective alternative to the more complex and more expensive known solutions can be offered. It is thereby possible to switch from catalog bearings to closed bearing units which can be readily assembled at clients' premises and which have a guaranteed service-life.

Other advantages particularly involve the material use. Owing to the small ring widths of the individual tapered roller bearings, the use of stepped blanks is possible. A considerably lower material use of expensive roller bearing steel is thereby achieved. The intermediate rings are preferably produced from normal cost-effective construction steel and a cost reduction is thereby achieved overall.

In a preferred embodiment of a wheel bearing unit according to the invention, the outer intermediate ring has at the end faces thereof an intermediate ring profile which in each case moves into abutment with a complementarily shaped outer ring profile at the end face of the outer rings.

Preferably, the profiles are in each case a stepped profile. This is simple to produce, for example, by means of boring, in the respective components. Owing to the sizing of these profiles, the bearing play can be adjusted in a simple manner.

Owing to the construction according to the invention, a closed, non-separable bearing unit is provided. Other advantageous construction variants are set out in the dependent claims.

BRIEF DESCRIPTION OF THE DRAWINGS

Preferred embodiments of the invention are explained below with reference to the Figures, in which.

DETAILED DESCRIPTION

Figure 1:
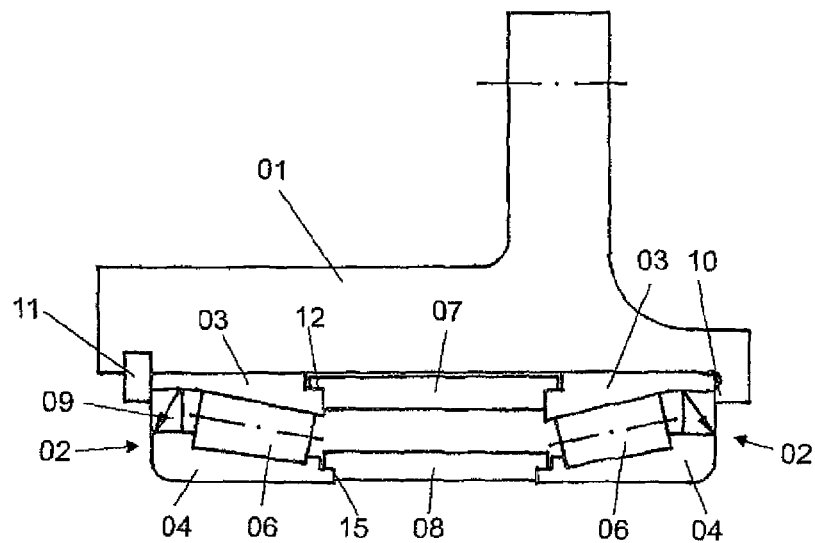
FIG. 1 is a sectioned illustration of a wheel bearing unit mounted on a hub.

FIG. 1 is a sectioned illustration of a wheel bearing unit which is mounted on a hub 01. The wheel bearing unit comprises two tapered roller bearings 02, each having an outer ring 03, an inner ring 04 and tapered rollers 06 which are arranged therebetween as roller members.

An outer intermediate ring 07 is arranged between the outer rings 03. An inner intermediate ring 08 is provided between the inner rings 04. The bearing unit is connected together by means of the inner intermediate ring 08 and the inner rings 04 (see FIGS. 4 and 5). A seal 09 seals the inner side of the bearing against contamination.

The wheel bearing unit is pushed/pressed in the preassembled state into the wheel hub 01 from one side as far as a stop 10 and subsequently secured in the hub 01 by means of a securing ring 11. The assembly can be carried out on a simple hub form using conventional tools without any specialist knowledge.

Figure 2:
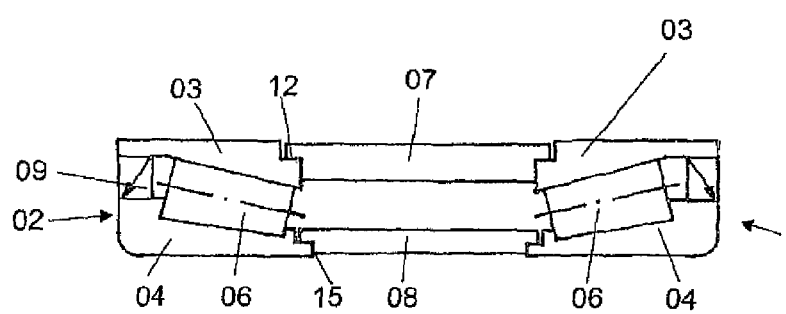
FIG. 2 shows a preassembled wheel bearing unit according to FIG. 1.

FIG. 2 shows the wheel bearing unit in the preassembled state, as may be marketed, for example, in a replacement part dealership. The components of the wheel bearing unit are identical to those described above.

Figure 3:
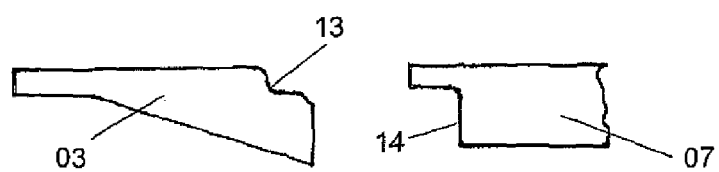
FIG. 3 shows a possible profile configuration of the outer rings and an intermediate ring for a preferred embodiment of the invention.

A substantially step-like connection joint 12 is formed between the outer rings 03 and the outer intermediate ring 07. The outer ring 03 and the outer intermediate ring 07 each carry at the end face thereof a complementarily shaped profile 13, 14 (see also FIG. 3), respectively, which is preferably formed as a stepped profile by means of a bore 13 in the outer ring 03 and a complementary bore 14 in the outer intermediate ring 07. With the connection joint 12 on the outer intermediate ring, the bearing play can be adjusted, that is to say, the extent to which one bearing ring can be displaced with respect to the other in a radial direction (radial play) or in an axial direction (axial play) without dimensional loading from one limit position into the other.

Via the inner intermediate ring 08, the bearing unit is preferably connected by means of a catch connection (not illustrated in FIG. 2). Between the inner rings 04 and the inner intermediate ring 08, a connection joint 15 also extends in a substantially stepped manner. The catch connection is illustrated in preferred embodiments in FIGS. 4 and 5. This can be carried out both on an outer diameter of the inner intermediate ring 08 and inner ring 03 (FIG. 4) and on an inner diameter (FIG. 5).

Figure 4:
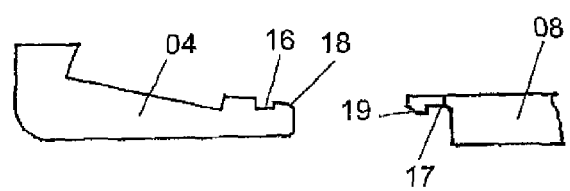
FIG. 4 shows a preferred embodiment of a catch connection.

In the embodiment illustrated in FIG. 4, in the region of the connection joint 15 a radial recess 16 is constructed in the outer contour of the inner ring 04 whilst a radial recess 17 is formed in the inner contour of the inner intermediate ring 08.

Figure 5:
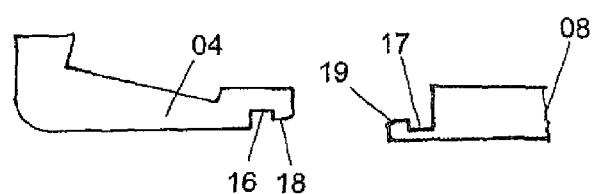
FIG. 5 shows an alternative embodiment to the connection variant illustrated in FIG. 4.

In the embodiment illustrated in FIG. 5, the radial recess 16 is formed in the inner contour of the inner ring 04 whilst the radial recess 17 is provided in the outer contour of the inner intermediate ring 08.

In both embodiments mentioned above, the recesses 16, 17 are adjoined in an axial direction by radially extending catch elements 18, 19 which each engage in the recess of the other component when the connection is engaged.

Figure 6:
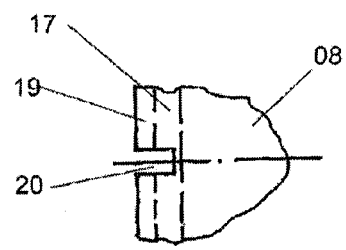
FIG. 6 is a detailed illustration of an inner intermediate ring.

In order to facilitate the assembly of the wheel bearing unit where applicable, axially extending slots 20 may be arranged in the inner intermediate ring 08 so as to be distributed at the periphery, as illustrated in FIG. 6. A resilient action of the catch elements 19 when the inner rings 04 are connected to the inner intermediate ring 08 is thereby achieved. The configuration of such catch connections is known to the person skilled in the art and therefore further details are not provided here.

Figure 7:
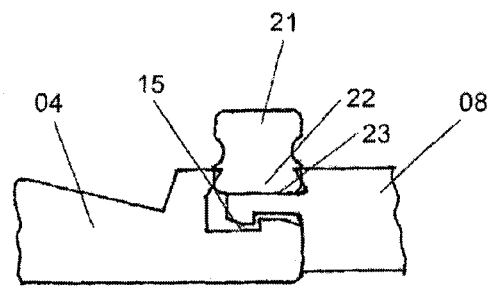
FIG. 7 shows a connection between an inner ring and an inner intermediate ring having a seal.
Figure 8:
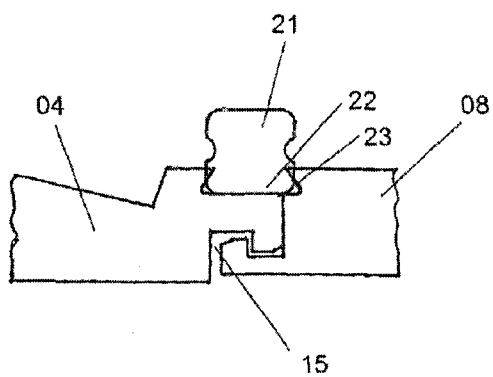
FIG. 8 shows an alternative embodiment of the connection variant illustrated in FIG. 7.

FIGS. 7 and 8 illustrate the use of an additional seal 21. This is preferably used in rear axle bearings. The seal 21 is arranged in a groove 22 which is formed between the inner ring 04 and the inner intermediate ring 08 with a closed connection joint 15 in a radial direction. A base face 23 of the groove 22 is larger than the radial opening of the groove 22. Such a seal is described, for example, in DE 10 2006 026 443 A1.

Figure 9:
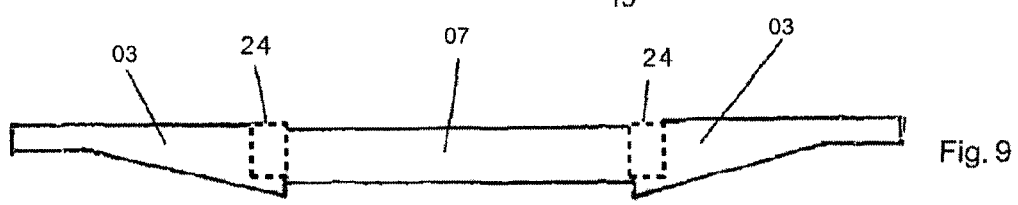
FIG. 9 shows a schematic illustration of the outer rings and intermediate ring.

FIG. 9 schematically shows an outer seal 24 arranged in each case between the outer rings 03 and the outer intermediate ring 07.

LIST OF REFERENCE NUMERALS

01 Hub
02 Tapered roller bearing
03 Outer ring
04 Inner ring
05—
06 Tapered rollers
07 Outer intermediate ring
08 Inner intermediate ring
09 Seal
10 Stop
11 Securing ring
12 Connection joint

13 Bore
14 Bore
15 Connection joint
16 Recess
17 Recess
18 Catch element
19 Catch element
20 Slot
21 Seal
22 Groove
23 Base face

The invention claimed is:

1. A wheel bearing unit comprising:
two tapered roller bearings arranged in a mirror-inverted manner, each having an inner ring and an outer ring;
an outer intermediate ring; and
an inner intermediate ring, the outer intermediate ring being arranged in an axial direction between the outer rings of the two tapered roller bearings, the inner intermediate ring being arranged in an axial direction between the inner rings of the two tapered roller bearings, the inner intermediate ring forming a connection between the inner rings,
wherein the outer intermediate ring has at end faces thereof an intermediate ring profile, which in each case moves into abutment with a complementarily shaped outer ring profile at a further end face of the outer rings in a connection joint.

2. The wheel bearing unit as recited in claim 1 wherein the intermediate ring profile is a stepped profile.

3. The wheel bearing unit as recited in claim 1 wherein the inner rings are connected to the inner intermediate ring by a catch connection.

4. The wheel bearing unit as recited in claim 3 wherein the catch connection on the inner rings and the inner intermediate ring is formed by radial recesses in the inner intermediate ring, retention claws on the intermediate ring, a radial recess in each inner ring and a retention claw on each inner ring, each retention claw on the inner intermediate ring adjoining a corresponding one of the radial recesses in the inner intermediate ring in an axial direction, each retention claw on the inner rings adjoining a corresponding one of the radial recesses in the inner ring in the axial direction, each retention claw on the intermediate ring being engagable in one of the recesses in one of the inner rings and the retention claw on each of the inner rings being engagable in one of the recesses in the inner intermediate ring to permit assembling the wheel bearing unit.

5. The wheel bearing unit as recited in claim 4 wherein the recess and the retention claw of the inner rings are provided on an outer periphery of the inner rings and the recess and the retention claw of the inner intermediate ring are provided on an inner periphery of the inner intermediate ring.

6. The wheel bearing unit as recited in claim 4 wherein the recess and the retention claw of the inner rings are provided on an inner periphery of the inner rings and the recess and the retention claw of the inner intermediate ring are provided on an outer periphery of the inner intermediate ring.

7. The wheel bearing unit as recited in claim 3 wherein the inner intermediate ring has at the end faces thereof at least one axially extending slot.

8. The wheel bearing unit as recited in claim 1 further comprising a seal arranged in each case between the inner ring and the inner intermediate ring.

9. The wheel bearing unit as recited in claim 1 further comprising an outer seal arranged in each case between the outer rings and the outer intermediate ring.

\* \* \* \* \*